United States Patent

[11] 3,604,183

| [72] | Inventor | Karl Iseli, Jun<br>Near der Reithalle, 8914 Aeugst am<br>Albis/Zurich, Switzerland |
|---|---|---|
| [21] | Appl. No. | 14,028 |
| [22] | Filed | Feb. 25, 1970 |
| [45] | Patented | Sept. 14, 1971 |
| [32] | Priority | Feb. 28, 1969 |
| [33] | | Switzerland |
| [31] | | 3295/69 |

[54] BRIDLE
15 Claims, 2 Drawing Figs.

[52] U.S. Cl. ............................................... 54/6, 54/36
[51] Int. Cl. ............................................... B68b 01/06
[50] Field of Search ................................... 54/6, 24, 35, 36, 2

[56] References Cited
UNITED STATES PATENTS

| 65,216 | 5/1867 | Hartman | 54/6 |
| 72,831 | 12/1867 | Ferry | 54/36 |
| 152,518 | 6/1874 | Sanborn | 54/6 |
| 3,263,399 | 8/1966 | Faragher | 54/6 |

*Primary Examiner*—Hugh R. Chamblee
*Attorney*—Werner W. Kleeman

ABSTRACT: There is disclosed a horse bridle comprising a headband, throatlatch and headpiece, a mouthpiece bit, and a first rein connected with said mouthpiece bit. Cheekpieces are provided at both sides of the bridle which extend between the headpiece to said mouthpiece bit connected with the first rein. Additionally, there is a noseband and a chinband, and a second rein is connected with this noseband. The bridle also has a martingale, and one of the reins are guided via the martingale and then connected with the other rein, so that when the horse goes in front of the rein, in other words is not being rein-checked the control of the horse at least for the most part occurs via the martingale-guided rein, whereas when the horse is rein-checked the control of the horse at least for the most part occurs via the rein which is not guided via the martingale.

INVENTOR.
KARL ISELI, JUN.
BY Werner W. Kleeman
ATTORNEY

BRIDLE

BACKGROUND OF THE INVENTION

The present invention broadly relates to harnesses and, more specifically, pertains to a new and improved bridle for a horse.

There are already known to the art a whole group of bridles, especially also those which are employed for the riding and breaking-in of high-spirited and vigorous horses. These bridles are equipped with the most different types of reins and rein combinations, such as for instance tie-up reins, double-reins, the so-called Thiedemann rein, reins with martingale and so forth. Likewise numerous are the types of mouthpiece bits which are used with these bridles, such as rods with or without chains, especially chin chains, chains alone, snaffle bits, curbs, and recently the so-called Thiedemann rod, and the like.

Now all of the previously known bridles are associated with the drawback that they only act upon the lower jaw as well as the eyeteeth and corners of the lips of the horse. With many young horses and all of the high-spirited horses such causes pain or pressure against which the horses readily tends to buck because the of stubbornness or panic-stricken fear, and therefore, will not obey the rider.

SUMMARY OF THE INVENTION

Accordingly, it is a primary object of the present invention to provide a new and improved bridle which effectively overcomes the aforementioned drawbacks.

A further significant object of the present invention relates to a new and improved bridle which is more comfortable for the horse to wear, does not result in pain to the horse during riding thereof, and still allows for adequate control of the horses by the rider.

Now, in order to implement these and still further objects of the invention, which will become more readily apparent as the description proceeds, the invention bridle is of the type incorporating a headband, throatlatch and headpiece, with checkpieces at both sides of the bridle extending to the mouthpiece bit which is connected with the one rein. The bridle also has a noseband and chinband. Now according to an important aspect of the invention a second rein is arranged at the noseband, with one of the reins initially being guided via a martingale and thereafter being connected with the other rein. The entire arrangement is such that when the horse move in front of the rein, in other words is not being rein-checked, the control of the horse at least for the most part occurs via the martingale-guided rein, whereas when the horse is rein-checked the control of the horse at least for the most part occurs via the rein which is not guided by means of the martingale.

Now the second rein can be directly secured to the noseband. However, it is advantageous to arrange at both sides of the noseband, in each case, a bandpiece, at the ends of which the second rein is arranged through the agency of a respective ring member. These ring members are preferably additionally supported via a respective cheekband. The cheekbands support the ring members at the height of the mouthpiece bit, for instance a snaffle. It is also desirable if the ring members are situated somewhat lower than the mouthpiece bit.

The cheekbands which are preferably provided for the rein of the nosebands can be advantageously adjustable in length and directly secured to the cheekpieces for the bit. However, the cheekbands are preferably secured independently of the cheekpieces to the headpiece. As a result, the arrangement of the second rein at the region of the head is extensively independent of the first rein.

Furthermore, it is possible to construct the second rein such that it can be suspended at the normal rein by means of a few expedients or devices which can be simply mounted at the normal bridle, such as rings at the noseband and at the cheekbands as well as at the rein.

In order to accommodate the bridle to every horse, it is advantageous if at least one of the reins is constructed to be adjustable in length. So as to achieve the desired guiding of the horse, in the one instance at the noseband and in the other instance at the mouthpiece bit, it is particularly advantageous if the martingale is situated low.

The invention bridle is based upon the recognition that horses which refuse to move rearwards, can only be held by the hand at the nose and must be guided in order to cause them to move rearwards. The inventive bridle results in completely new possibilities.

It is possible to now guide the second rein, the noseband rein, via the martingale and the first rein, the snaffle rein, directly to the hand of the rider. In this instance, the inventive bridle is especially suitable for riding vigorous, sensitive, hand shy or nervous horses which normally like to have their head over or past the reins and which buck against their guiding or control at the mouthpiece bit, that is to say, at the first rein, the snaffle rein. By means of the noseband rein such horses can again be softly rein-checked due to the slight acting pressure upon the nose.

A further possibility resides in the fact that the first rein, the snaffle rein, can be guided via the martingale and the second rein, the noseband rein, directly to the hand of the rider. This bridle arrangement is especially suitable for the breaking-in of inexperienced horses. Such horses are not yet familiar with the uncomfortable action of the snaffle rein, do not buck against such, rather tend to release the unpleasant pressure of the snaffle rein upon the mouth in that they lower the head. With the bridle of the invention the unpleasant pressure of the snaffle rein, upon lowering of the head of the horse, is transformed into the comfortable pressure which is exerted by the noseband, that is to say, the noseband rein upon the horse. Horses tend to automatically assume the position of the head which is most comfortable. Hence, the relationship of the noseband rein and the snaffle rein is advantageously regulated with respect to one another in such a manner that the horses with the correct head position are not exclusively guided at the noseband rein, rather also there is present a slight guiding or control of the horse at the snaffle rein. The inexperienced horse therefore learns in a very gentle manner the correct head position and guiding at the rein. Also difficult horses can be positively trained in this manner.

BRIEF DESCRIPTION OF THE DRAWING

The invention will be better understood and objects other than those set forth above, will become apparent, when consideration is given to the following detailed description thereof. Such description makes reference to the annexed drawing wherein.

DESCRIPTION OF THE PREFERRED EMBODIMENT

Figure 1:
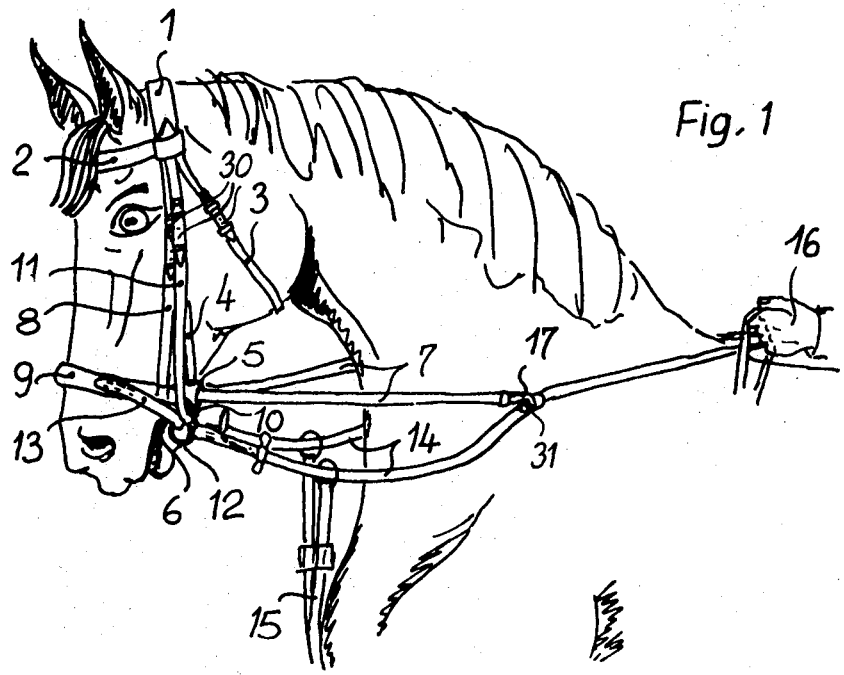
FIG. 1 schematically illustrates the inventive bridle with the horse being checked at the rein.

Describing now the drawing, the bridle depicted in the figures will be seen to encompass a headpiece 1 which is supported via a headband 2 and a throatlatch 3. Cheekpieces 4 are arranged at the headpiece 1 to both sides of the bridle, that is, the head of the horse, and at the lower ends there is secured by ring members 5 the mouthpiece bit, preferably a snaffle. A first rein 7 is arranged at the ring members.

Continuing, it will be recognized that further cheekpieces 8 extend from the headpiece 1, at both sides at the head of the horse, to the region of the mouthpiece bit 6 and at this location support a noseband 9. Situated opposite the noseband 9 is a chinband 10 which is snapped below the bit about the chin of the horse in order to prevent excessive opening of the horse's mouth.

Furthermore, at each side of the headpiece 1 there is arranged a respective further cheekband 11 which extends approximately to the height of the mouthpiece bit 6, preferably somewhat lower, and in each instance carries at a ring member 12 a bandpiece 13 connected with the noseband 9. Additionally, a second rein 14 is secured to the ring members 12, which initially is guided via a low-situated martingale 15 and thereafter is united with the first rein 7. In the exemplary embodiment illustrated the second rein 14 is constructed to be continuous and somewhat stronger and extends to the hands 16 of the rider, since this second rein, must transmit a greater tension force than the first rein 7 when the horse is rein-checked. However, it is also possible to construct the first rein 7 so that it is continuous and of the same strength and extends to the hand 16 of the rider, similar to the second rein 14 just considered. In the first case the first rein is connected with the second rein and in the second case the second rein is connected with the first rein. To this end there can be advantageously employed spring safety hooks or snap hook and eye means 17. In contrast to the illustrated embodiment, instead of the second rein 14, also the first rein 7 can be guided via the martingale 15, as already has been described heretofore.

The reins 7 and 14 are constructed or arranged in such a manner that their length ratio with respect to one another can be adjusted. Such can be undertaken, for instance, in the provision of suitable buckles at one of both reins, such as the buckle arrangement 30 shown at the throat latch 3 and the checkbands 8, 11, or by arranging different eyelets 31 which are distributed over the length of the continuous rein and with which there can be hooked or engaged the spring safety hook 17.

Figure 2:
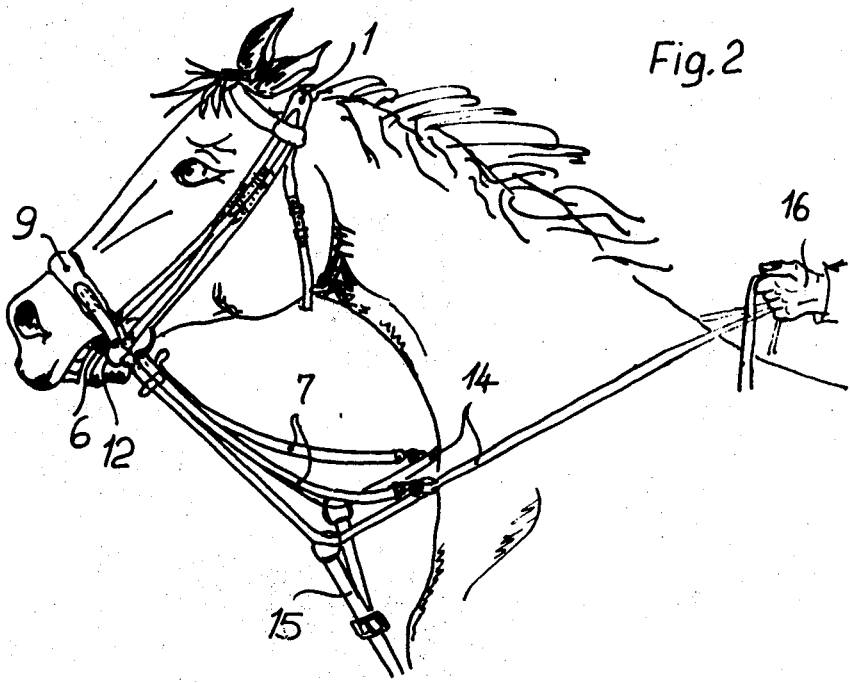
FIG. 2 illustrates the position of the bridle when the horse refuses to obey and moves in front of the bridle.

FIG. 2 illustrates a vigorous horse tending to escape the pressure pain. In so doing, it is guided back into the normal position by the second rein 14 guided by the martingale 15, the second rein 14 being disposed at a steep angle between hand 16, the martingale 15 and the noseband 9. Because of this steep angle the first rein 7 acting upon the bit 6 is relieved, and the horse does not feel any pressure or pain upon the jaw. If the horse again moves slowly at the rein, in other words is rein-checcked, as shown in FIG. 1, then the angle between the noseband 9, the martingale 15 and the bands 16 becomes flatter and the first rein 7 acting upon the bit 6 again becomes effective in a soft transition. The rider can thus ride the calmed horse normally at the bit.

Every difficult horse can thus be trained quietly and without force. If the horse struggles against the pressure at the bit and throws its head high, then in a very gentle transition it will be immediately guided downward via the second rein, the nose rein 14, at the nose into the normal position. By selecting the adjustment of the length relationship of the first and the second reins, it is possible to regulate the bridle to each horse. In order to adjust the rein relationship the horse is advantageously adjusted at the rein, that is to say, the head of the horse must be in the vertical position. The following values can be used as guides for instance.

|  | First rein without martingale | Second rein with martingale |
|---|---|---|
| for vigorous horses | 10% to 50% | 90% to 50% |
| for high-spirited horses | 20% to 50% | 80% to 50% |
| for young horses | 0% to 50% | 100% to 50% |
| for breaking-in horses | with martingale 45% | without martingale 55% |

The percent values give, in each instance, represent the efficiency or effectiveness of the individual rein. The values can only serve as reference values since the horses have very different characters, and there must be found for each horse the correct control or guiding, that is to say, the guiding of the first or second rein via the martingale and the correct selection of the rein relationship.

While there is shown and described present preferred embodiments of the invention, it is to be distinctly understood that the invention is not limited thereto, but may be otherwise variously embodied and practiced within the scope of the following claims.

What is claimed is:

1. A bridle comprising a headband, throatlatch and headpiece, a mouthpiece bit, a first rein connected with said mouthpiece bit, cheeckpieces at both sides of the bridle extending between said headpiece to said mouthpiece bit connected with said first rein, a noseband and a chinband, a second rein connected with said noseband, a martingale, one of said reins being guided via said martingale and then connected with the other rein, whereby when the horse moves in front of the reins the control of the horse at least for the most part occurs via the martingale-guided rein, whereas when the horse is rein-checked the control of the horse at least for the most part occurs via the rein which is not guided by means of the martingale.

2. A bridle as defined in claim 1, further including bandpieces arranged at both sides of said noseband, ring members provided for such bandpieces, said second rein being connected to the ends of said bandpieces via said ring members.

3. A bridle as defined in claim 2, further including a respective cheekband for additionally supporting said ring members.

4. A bridle as defined in claim 2, wherein said ring members are disposed approximately at the height of said mouthpiece bit.

5. A bridle as defined in claim 2, wherein said ring members are disposed lower than said mouthpiece bit.

6. A bridle as defined in claim 3, wherein said cheekbands are secured to cheekpieces.

7. A bridle as defined in claim 6, wherein said cheekbands incorporate means for adjusting the length thereof.

8. A bridle as defined in claim 3, wherein said cheekbands are secured to said headpiece.

9. A bridle as defined in claim 8, wherein said cheekbands include means for adjusting the length thereof.

10. A bridle as defined in claim 1, wherein at least one of both reins incorporates means for adjusting the length thereof.

11. A bridle as defined in claim 1, wherein both of said reins have cooperating means to enable said reins to be detachably connected to one another.

12. A bridle as defined in claim 11, wherein said cooperating means comprise snap hook and eye means for detachably connecting both of said reins with one another.

13. A bridle as defined in claim 2, wherein said second rein is detachably connected to said noseband and said cheekpieces.

14. A bridle as defined in claim 1, wherein said second rein extends over said martingale.

15. A bridle as defined in claim 1, wherein said martingale is situated low.